(12) United States Patent
Phong et al.

(10) Patent No.: US 7,003,585 B2
(45) Date of Patent: Feb. 21, 2006

(54) HIGH SPEED SERIAL INTERFACE

(75) Inventors: San A. Phong, Cerritos, CA (US); Kent A. Williams, Hawthorne, CA (US); Yuanta Kuo, Torrance, CA (US); Thomas H. C. Yew, Rancho Palos Verdes, CA (US)

(73) Assignee: Xerox Corporation, Stamford, CT (US)

( * ) Notice: Subject to any disclaimer, the term of this patent is extended or adjusted under 35 U.S.C. 154(b) by 898 days.

(21) Appl. No.: 09/947,234

(22) Filed: Sep. 5, 2001

(65) Prior Publication Data

US 2003/0051058 A1     Mar. 13, 2003

(51) Int. Cl.
   *G06F 15/16* (2006.01)
(52) U.S. Cl. ................ 709/250; 709/230; 709/232
(58) Field of Classification Search ........... 709/250, 709/230, 232
   See application file for complete search history.

(56) References Cited

U.S. PATENT DOCUMENTS

| | | | | |
|---|---|---|---|---|
| 5,559,963 A | * | 9/1996 | Gregg et al. ........... 709/234 |
| 5,633,992 A | * | 5/1997 | Gyllenskog ............ 358/1.15 |
| 5,940,582 A | * | 8/1999 | Akabori et al. ........ 358/1.13 |
| 6,633,403 B1 | * | 10/2003 | Nonaka ................. 358/1.15 |
| 6,734,986 B1 | * | 5/2004 | Kuroi et al. ........... 358/1.16 |
| 6,831,899 B1 | * | 12/2004 | Roy ....................... 370/260 |

* cited by examiner

*Primary Examiner*—Zarni Maung
*Assistant Examiner*—Nghi Tran
(74) *Attorney, Agent, or Firm*—Jeannette Walder

(57) ABSTRACT

A high speed, serial interface employs a simplified protocol which minimizes overhead enabling uncompressed image data to be sent serially over a long distance in real-time devices, such as a color printer. Because the error rate experienced in high speed serial and fiber optic links is very small and finite, the protocol removes the requirement to retransmit real time data. The protocol for initiator device-target device communications includes an idle message frame for indicating a device is ready for communication; a control word frame for sending a data request from the target device; a control word frame for indicating a transfer mode from the initiator device; and a data frame, wherein in response to a data request from the target device, the initiator device transmits a control word frame followed by the requested data.

13 Claims, 6 Drawing Sheets

SINGLE EVENT CONTROL WORD

CONTROL WORD AND SCANLINE DATA

BASIC SCANLINE REQUEST TIMING

SCANLINE REQUEST AFTER FIRST MODE SELECT

XIC FIFO PREFILL FOR FIRST PAGE

END OF PAGE TIMING

XDM3 - C Tests for
Negation of Page Request
and XIC FIFO Empty

HIGH SPEED SERIAL INTERFACE

BACKROUND OF THE INVENTION

This invention relates in general to protocols for transmitting digital data and, in particular, to protocols for use in real-time, high data rate devices such as color printers.

The real time, high data rates required by fast color printers present major interconnect packaging and data integrity issues. For example, in a state of the art production color printer, the required data transfer rate and cable distance between the Digital Front End (DFE) and the Image Output Terminal (IOT) is 150 MB/s and 75 feet for each color separation. For color printing, four-color separations (CMYK) would be needed and require a total of 600 MB/s data transfer. No known serial or parallel interface (with existing protocols) can meet the required cable length and bandwidth requirements for real time data where higher level error detection and retransmission of data is not practical.

For example, the Xerox DC-60 color printer DFE to IOT interface is a parallel interface implemented on copper wire. Forty lines (times four, one set for each color separation) are used to transmit the protocol which includes differential signals such as a clock, page request, line request, line valid and lines for data. The maximum data transfer achievable with this system is 70 MB/s. The fiber channel and SCSI protocols are high-level protocols with significant overhead (several layers to differentiate senders, error checking and retransmission) and non-real-time characteristics which make them unsuitable for high speed, real time applications, such as for color printers. Because of such overhead, such protocols transmit only 60–70% of the available bandwidth as data. A high speed serial interface with minimal overhead for uncompressed data is required.

SUMMARY OF THE INVENTION

A high speed, serial interface according to the invention employs a simplified protocol which minimizes overhead enabling uncompressed image data to be sent serially over a long distance in real-time devices, such as a color printer. Because the error rate experienced in high speed serial and fiber optic links is very small and finite, the high speed, serial interface and protocol removes the requirement to retransmit real time data. With error rates expected to be in the range of $10^{-12}$, an occasional incorrect pixel or tag is not detectable by the user. This link can be standardized for a wide range of high-speed target device interfaces.

A high speed serial interface, according to the invention, includes an initiator device for generating data and messages, wherein the initiator device includes a transceiver for sending and receiving data and messages using a serial protocol; a target device for receiving data and messages, wherein the target device includes a transceiver for sending and receiving data and messages using the serial protocol; and a transmission media for coupling the initiator device and the target device; wherein the serial protocol includes a plurality of time frames comprising an idle message time frame for indicating a device is ready for communication, wherein each of the initiator device and the target device transmits an idle frame when it is ready for communication; a control word frame for sending a data request from the target device; a control word frame for indicating a transfer mode from the initiator device; and a data frame, wherein in response to a data request from the target device, the initiator device transmits a control word frame followed by the requested data.

A protocol structure for high-speed, serial initiator device-target device communications includes a plurality of time frames comprising an idle message time frame for indicating a device is ready for communication, wherein each of the initiator device and the target device transmits an idle frame when it is ready for communication; a control word frame for sending a data request from the target device; a control word frame for indicating a transfer mode from the initiator device; and a data frame, wherein in response to a data request from the target device, the initiator device transmits a control word frame followed by the requested data.

A protocol structure for high-speed, serial DFE-printer communications, includes a plurality of time frames comprising an idle message time frame for indicating a device is ready for communication, wherein each of the DFE and the printer transmits an idle frame when it is ready for communication; a printer control word frame for sending a page request and a line request from the printer; a DFE control word frame for indicating a transfer mode from the DFE; and a data frame, wherein in response to a page request from the printer, the DFE transmits a control word frame followed by the requested data.

The high speed serial interface with protocol can be used for communications between any initiator and target devices, and is easily implemented for high speed color printers. For example, the high-speed serial link was implemented between the Xerox Multi-mode Decompression Module (XDM3-C) residing in the Xerox Controller and the Interface Card (XIC) in the print engine (IOT). The high speed serial interface implementing the protocol sends real-time image data and tag to the print engine at 1.5 Gbps. Four high speed serial interfaces are used to drive four color separation data to the IOT. This is done without requiring high-level protocol software support. The high speed serial interface is implemented using fiber optics as a transmission media for long distance, although copper may be used for shorter distances and provides a cost reduced option. With very small but finite error rates (estimated to be $10^{-12}$), an occasional incorrect pixel or tag may be transmitted with no degradation in observed image quality or user satisfaction.

The XDM3-C decompresses compressed data and sends the decompressed data (raw video) to the XIC in the print engine in real-time. The high speed serial interface includes a transmit and receive pair and operates in full duplex mode. The protocol in this embodiment is point-to-point protocol between the XDM3-C and the XIC, however additional bits in the control words could be added to identify sender and destination. No embedded processor on both sides is needed to manage protocols and data flow. Data transfer on the serial link is 8b/10b encoded and at 1.5 Gbps or 150 MB/s for image and tag. Total bandwidth for four links is 600 MB/s. This interface can be run faster by increasing the sender and receiver's clock speed and media transmission rate.

DETAILED DESCRIPTION

The high speed serial interface and protocol of the invention may be used to facilitate communication between any initiator device and any target device. For convenience, the high speed serial interface and protocol will be described in particularity with regard to an implementation embodied in the Xerox Constellation DFE-IOT.

The following abbreviations are used throughout and are listed here for convenience:

| | |
|---|---|
| CMYK | Cyan, Magenta, Yellow, Black Color Model |
| CPLD | Complex Programmable Logic Device |
| CRM | Contone Rendering Module |
| IOT | Image Output Terminal |
| JIDI | Jadis Image Data Interface |
| XCM3 | Xerox XM2 Compression Module |
| XDM3 | Xerox XM2 Decompression Module |
| XCII | XM2 Combiner IOT Interface ASIC |
| XIC | Constellation Interface Card |
| XM2 | Xerox Multi-Mode Compression Technology |

Figure 1:
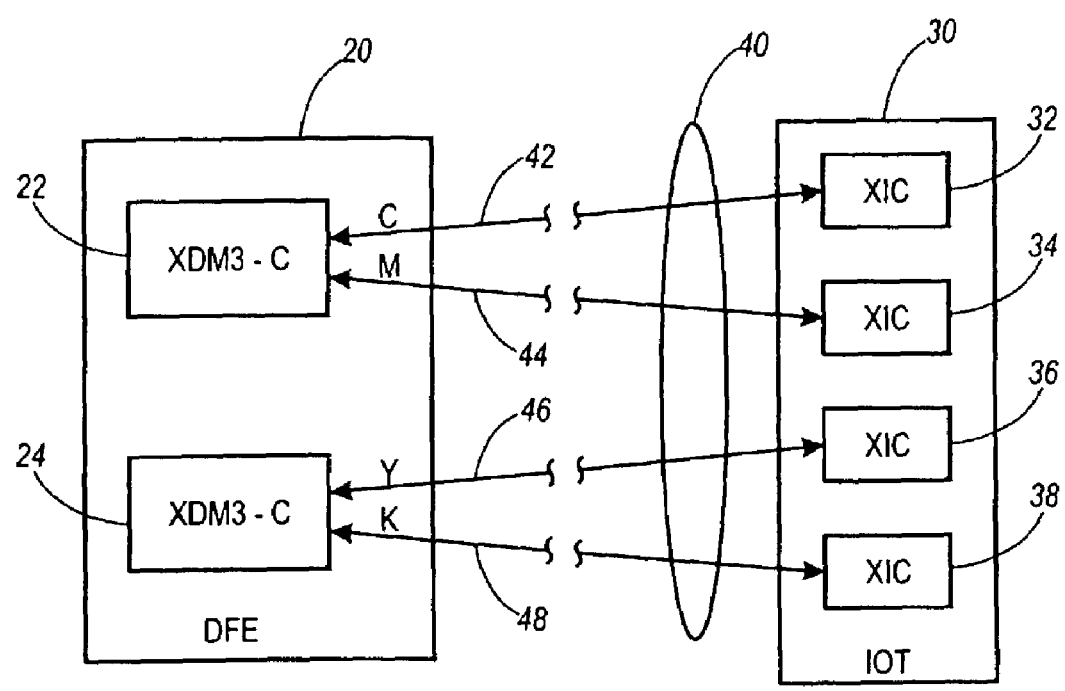
FIG. 1 is a block diagram of a high speed serial interface between a DFE and an IOT.

Referring to FIG. 1, DFE 20 is implemented with a high performance Sun platform and the addition of an XCM3-A compression module (not shown) and two XDM3-C decompression modules 22, 24. The XDM3-C decompression modules 22, 24 decompress the Xerox XM2.3 format color images and provide CMYK color data on four separate channels 42, 44, 46, 48. Two XDM3-C modules are used for the four color channels. Module 22 delivers the cyan 42 and magenta 44 channels. Module 24 delivers the yellow 46 and black 48 channels. The number of modules is a matter of convenience. All four channels could be included on a single module or each channel could have its own module.

The Constellation Interface Card (XIC) 32, 34, 36, 38 resides in the IOT 30 and receives color image data from the DFE 20. The Image data is sent from the XDM3-C modules to four XIC cards over a high speed serial link 40. Each card buffers a minimum of two scanlines of image data, which is passed to four Contone Rendering Modules (not shown) over a JIDI bus. No microprocessor is required to monitor the image data flow. Each card supports peak image and tag data rates of 1.2 Gbits per second. The CRM cards provide the rendering of the image by converting the 8 bit contone data to the highly addressable binary data required by a laser printing engine. The highly addressable binary data is sent to the ROS Interface Modules (RIM) which in turn drive the Raster Output Scanner (ROS) for each color plane.

Figure 2:
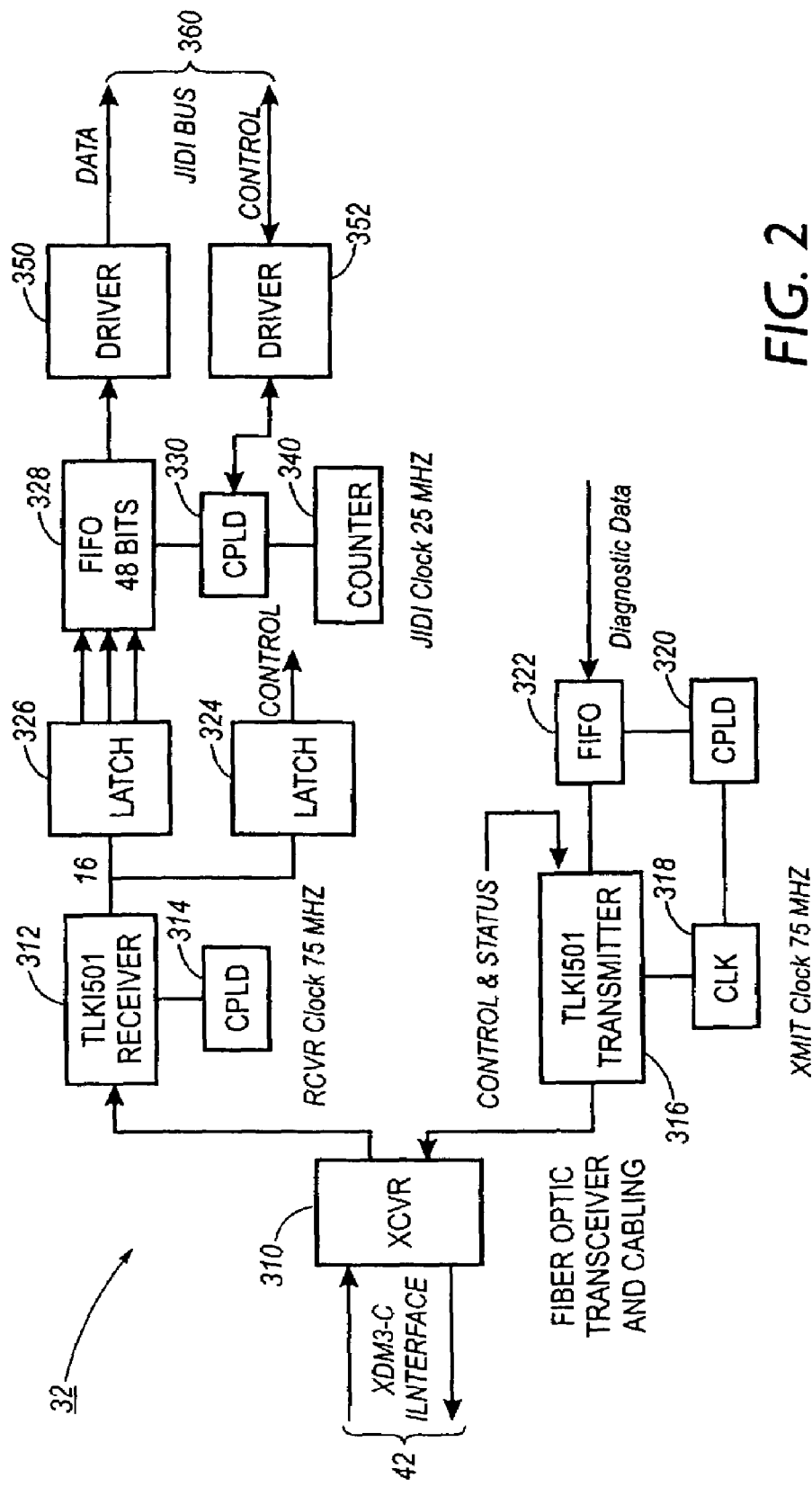
FIG. 2 is a block diagram of a XIC module.

Referring to FIG. 2, a block diagram of XIC card 32 is shown. Image and tag data 42 from XDM3-C interface 22 is received at fiber optic transceiver 310. Fiber optic transceiver 310 generates a serial electrical signal indicative of the image data which is sent to transceiver 312/316 (which consists of receiver 312 and transmitter 316), which converts the serial signal into 16 bit parallel raw video and latched by latches 326 and 324. This data is buffered in a 48 bit wide high speed synchronous FIFO 328 and passed through to the JIDI bus 360 via drivers 350 and 352.

The XIC implementation incorporates three different clocks. The FIFO input logic is clocked by the 75 MHz TLK1501 receiver clock 314 RX_CLK. This clock is recovered from the serial data stream sent from the XDM3-C. The TLK1501 Transmitter and control logic are clocked by the 75 MHz transmitter clock 318 GTX_CLK. The FIFO output logic and JIDI interface are clocked by the 25 MHz JIDI bus clock (not shown).

In this implementation the serial transceiver 312/316 is implemented with the Texas Instruments TLK1501 1.5 to 2.5 Gbps transceiver. This device handles the complexity of encoding, multiplexing, clock extraction, demultiplexing, and decoding. Other suitable transceivers may also be used.

The fiber optic interface is implemented with a compact optical transceiver 310 containing a semiconductor laser and PIN photodiode. A suitable package for the optical transceiver 310 is the Small Form Factor package. This package implements ten pins and utilizes the duplex MT-RJ connector. The transceiver 310 should support rates up to 1.5 Gbits per second on the link with cable lengths up to 200 feet. Molex currently offers a 1.5 Gbit per second optical transceiver in a 1×9 pin configuration with dual SC connectors, but other suitable transceivers may also be used.

The fiber optic cabling 40 connecting the XDM3-C and XIC implements a multi-mode fiber in each direction. One cable is used for each of the four XIC cards in the system. The fiber optic interface is designed to support a cable length up to 100 feet for this embodiment.

Alternatively a copper interface may be used. The copper interface option utilizes a very high bandwidth cable that is driven by the differential outputs of the TLK1501 transmitter. AC coupling is used to isolate the logic ground of the DFE from the logic ground of the IOT. The copper interface is designed to support a total cable length of 15 meters for this embodiment.

The FIFO buffer 328 may implemented with three 8K×16 bit high speed synchronous FIFO devices. This buffer has a total capacity of 48K bytes which represents 3.79 scanlines. Since data transfer in this embodiment from the XDM3-C is initiated when the FIFO is less than half full, the FIFO will not contain more than 2.895 scanlines under normal conditions. One device that may be used is the IDT72V263 from Integrated Device Technology, Incorporated. The IDT72V263 is a 3.3 volt, high density SuperSync II™ narrow bus FIFO.

The TLK1501 transmitter clock GTX_CLK is used for the FIFO write clock. The three FIFO devices are written individually as each 16 bit word is received from the XDM3-C. The JIDI bus DCLK is used for the FIFO read clock. The FIFO is read 48 bits at a time for data transfer to the JIDI bus.

The high speed serial interface operates in both normal mode and diagnostic mode (described below). Diagnostic mode allows the XIC 32 to return data in the XIC FIFO 322 (a separate FIFO for storing diagnostic data) to the XDM3-C. The diagnostic path includes a synchronizing FIFO 322 located between the XIC FIFO output and the TLK1501 transmitter 316. This FIFO allows data clocked by the JIDI bus 25 MHz clock to be passed through to the TLK1501 transmitter input which is clocked at 75 MHz. Diagnostic mode is controlled by state machines implementing the high speed serial interface protocol in the CPLD controller 330, 320. The first state machine 330 reads the XIC FIFO 328 and writes the data into the diagnostic FIFO 322. The second state machine 320 reads the diagnostic FIFO if data is available and then sends this data to the TLK1501 transmitter 316. Both state machines transfer data on demand until the XIC FIFO is empty.

The JIDI Interface 360 includes image and tag data, clock, control, and D.C. power. The image and tag data are written to the JIDI bus under control of a state machine implemented in a CPLD 330. The state machine responds to DFE_PageReq' and LineReq'. Data is written to the JIDI bus under control of the JIDI bus clock DClk. The signal ILine_Valid' is driven to provide the necessary synchronization for the device receiving the image and tag data. A counter 340 is implemented to terminate the data transfer for each scanline after the transfer of 8640 pixels. The data transfer for each scanline is accomplished with 2160 reads of the XIC FIFO 328.

The data drivers 350, 352 are implemented with three 16 bit wide TTL compatible open collector drivers. The JIDI bus signal Error' is asserted if an error condition is detected. The XIC uses the JIDI bus signal IReset' to reset the card at power up. IReset' is also used as the error condition reset. The XIC 32 is designed for a fixed scanline length of 8640 pixels. The scanline length is specified in the CPLD 330 that controls the JIDI interface and may be changed as necessary.

Figure 9:
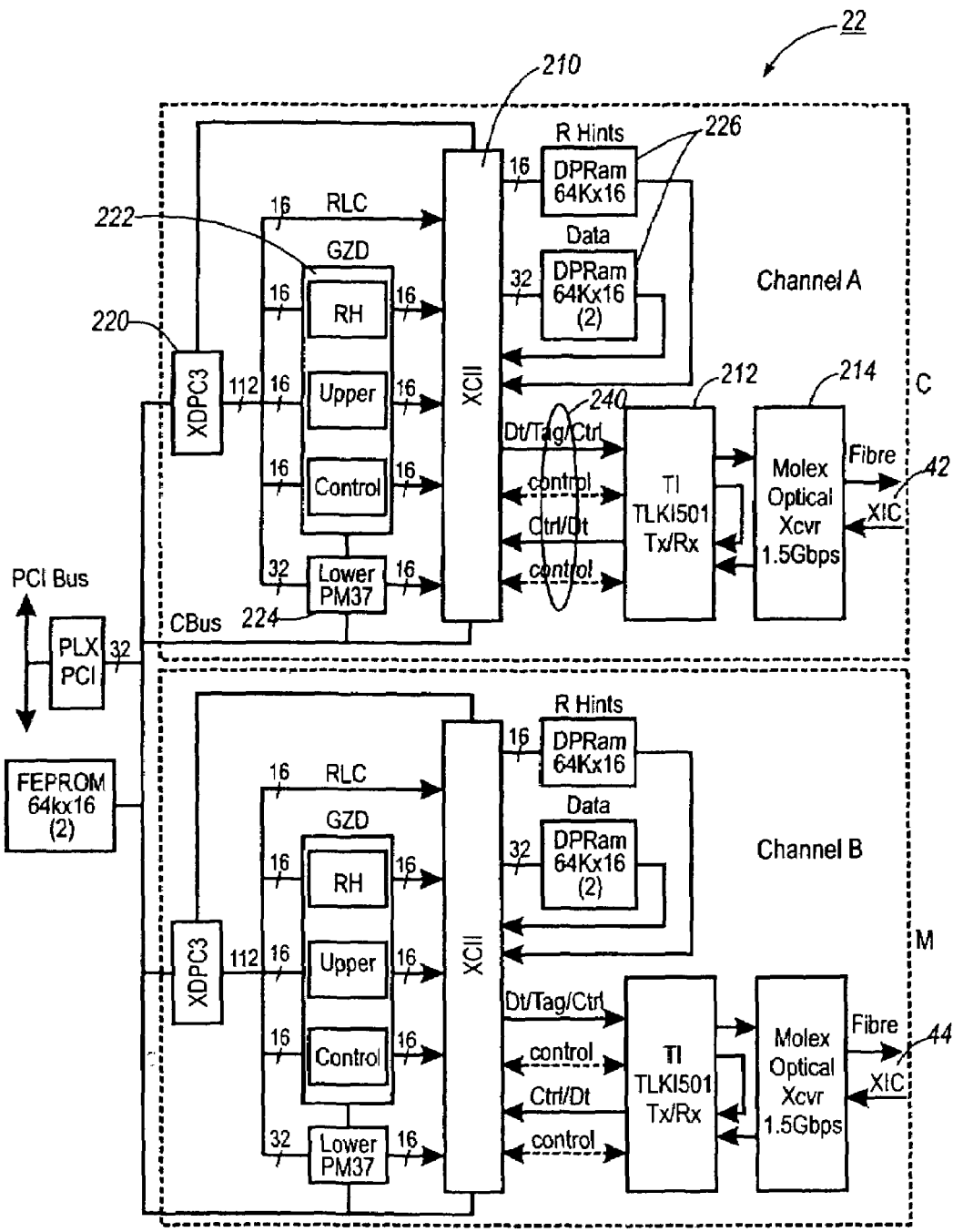
FIG. 9 is a block diagram of a XDM3-C module.

Referring to FIG. 9, a block diagram of the XDM3-C module 22 is shown. XDM3-C 22 includes XCII 210, which accepts inputs from three GZIP decompression channels, 222, a PM37 JPEG decompressor 224, and run-length-coded data from the XDPC3 chip 220. The three GZIP 222 decompression channels contain the XM2.3 Upper Plane, Rendering Hints Plane, and the Control Plane. The JPEG decompression 224 channel contains the lower data plane. The Run-Length-Coded data (RLC) 220 contains both video data and the corresponding rendering hints. The XCII 210 combines data from Lower Plane, Upper Plane or expanded RLC data based on the Control Plane data. The XCII 210 then outputs the combined video data, accompanied by the corresponding rendering hints, to the sync dual port SRAM 226. Video input data (upper, lower & RLC) to the XCII 210 is in either the 8×8-pixel block format or raster format. The block-to-raster conversion is accomplished by using external dual port synchronous SRAM. These SRAM's are under the control of the XCII. The Rendering Hints data is also merged by the XCII and sent to the SRAM pixel-synchronized with video data. The output section of the XCII 210 receives video and render hint data from the block to raster dual port SRAM 226. This data is first magnified, shifted and clipped before it is stored in internal scanline FIFO (not shown). The FIFO output data 240 is then delivered to the high speed serial interface at serial transceiver 212 which converts the parallel data input into a serial signal for input to optical transceiver 214 which generates the serial optical signal for transmission over the fiber optic link to the XIC.

The interface between the XDM3-C (XCII) and the XIC is a high speed serial link implemented with the Texas Instruments TLK1501 1.5 to 2.5 Gbps Transceiver. The TLK1501 supports an optical interface through the addition of an optical transceiver at each end of the interface (as described with reference to FIG. 2 for the XIC). The high speed serial interface is configured for full duplex operation. The XDM3-C sends video, tag, and control information to the XIC. The XIC sends control and diagnostic information to the XDM3-C. The high speed serial interface employs a transmitter, receiver, and optical transceiver at each end of the link. The transmitter and receiver are 16 bit devices and run at a clock rate of 75 MHz. This provides a peak data transfer rate of 1.2 Gbits per second (150 Mbytes per second). The interface implements a protocol that supports the transmission of image data and control words.

The TLK1501 is used at both ends of the interface and provides a full duplex serial link between the XDM3-C and the XIC. The TLK1501 will transmit and receive image data at a peak rate of 1.2 Gbits per second. The transmitter encodes the data with the addition of 4 additional bits for a baud rate of 1.5 GBaud on the link. The optical interface is implemented with the addition of an optical transceiver at both ends of the link. The optical transceiver includes a semiconductor laser and PIN photodiode.

The high-speed interface provides a full duplex high-speed serial link between the XCII and the XIC. A protocol is defined for the interface of control and data signals between the XCII and the XIC. The data transferred between XCII and XIC basically consist of control words, data words and idle frames implemented according to the protocol. Each control and data word is 16 bits wide. Based on the different operational mode, the control and data words are delineated differently. An idle frame is sent while the serial link is operational if neither a valid control word or data is requested. While the serial link is up, if neither valid control word or data word is requested through the serial link, an idle frame is sent instead. Control words may be sent as a single event or immediately preceding image data.

A control word sent from XIC to XCII includes: three fixed pattern control bits of '101' for verification, two XIC operation mode bits, page request and line request bits for separation '0' and '1', XIC FIFO half-full and empty status bits for separation '0' and '1', XIC reset complete bit, XIC error bit and JIDI reset status bit. The data word from XCII to XIC carries the image data in normal operation or the diagnostic data in diagnostic mode.

There may be six operation modes: XCII/XIC normal mode, XCII/XIC diagnostic mode, High speed transceiver internal loop-back mode, XDM3 channel to channel look back mode, local PRBS test mode and channel 1 and channel 2 PRBS test mode. For convenience, only normal mode and diagnostic mode are described below.

When the system is configured to run in high speed interface mode and operates in either XCII and XIC normal mode or diagnostic mode, the system has to perform a 'two steps reset sequence' from XCII to XIC. In other high-speed operation mode and all other operation modes, this reset sequence is not required. A 'two steps reset sequence' from XCII to XIC is done by performing two writes to the XCII to XIC control register. The first write with Bit [8:6]=101 is sent to XIC, to reset the related logic. The second write with Bit [8:6]=010 terminate this reset cycle. During these two writes, the Bit [5:4] for operation mode bits, and the Bit [3:0] for LED (if the optional LED is present in the system) must be set correspondingly and transferred to XIC. The operational mode bits should be set to the same values in both of these two reset sequences. Bit [5:4]=00 for normal operation and 11 for diagnostic function.

To ensure proper reset to the XIC, the reset cycle to XIC must be at least 1 microsecond long. In other words, the interval between these two write cycles in this reset sequence must meet this restriction by checking and ensure the Bit 9=0 in the XCII to XIC control register, before performing the next write to this control register.

At power up, it will take a moment for the high-speed transceiver to initialize and then enters into idle state. When running the XCII and XIC in normal or diagnostic mode both XCII and XIC wait to receive the idle frame each other to ensure the link is up before any control or data word is sent.

When the fiber optic link is up the system performs the first write of the 'two steps reset sequence' with XIC reset Bit [8:6]=101 to the XCII to XIC control register. One microsecond later the XIC should receive a second reset control word with Bit [8:6]=010 from the XCII. When XIC receives the second reset control word and completes the reset function it will send exactly one control word cycle with the Reset Complete bit=1 to XCII. This is followed by the transmission of a series of control words if it is in normal mode or by an idle frame in diagnostic mode. The system is required to perform this two steps XIC reset sequence any time when the mode is reconfigured. This reset sequence is performed right after the system has completed programming the global configuration register. If the reset sequence is not complete properly or reset at incorrect time, it is declared as reset error and the XCII issues an interrupt.

In normal mode, image and tag data are transferred from XCII to XIC. Normal mode further supports either single or dual-separations mode. In single separation mode all data comes from the separation '0' FIFO, which is consist of toggling between even and odd scanline FIFOs.

In dual-separation mode, the data will come from both of separations, even and odd FIFOs. The current scanline delivered will depend on which scanline request is received from the high-speed interface. The data output can be either from a single separation or scanline interleaved between separations depending on the separation's scanline requests. Only one scanline can be outputted at a time so both separation '0' and '1' scanline requests should not be asserted at same time. In this mode, when the two-step reset sequence is completed by the XCII and the XIC finishes the reset function, the XIC will return a control word with reset complete bit=1 for exactly one cycle. From that point the XIC continuously transfers the control word with page requests and line requests etc. to XCII, and XCII responds by sending scan line data to XIC. At any time when the mode is reconfigured between normal and diagnostic, the system is required to perform the two-steps XIC reset sequence.

Figure 3:
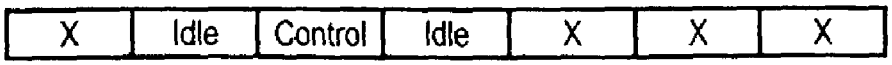
FIG. 3 is timing diagram of a single event control word.
Figure 4:
FIG. 4 is a timing diagram of a control word followed by data words.

In this mode, basically the word transferred from XCII to XIC right after the idle frame is considered as control word, otherwise it is the data word. There are two types of control words. A single control word is delineated as a single data frame inserted between two idle frames, refer to FIG. 3, it can be sent any time, between pages, after power up, with no image data followed. The first word transfer in the stream of scan-line data is also considered as control word, refer to FIG. 4, it may carry the LED display message, but is not intended to be used as reset control word.

Figure 5:
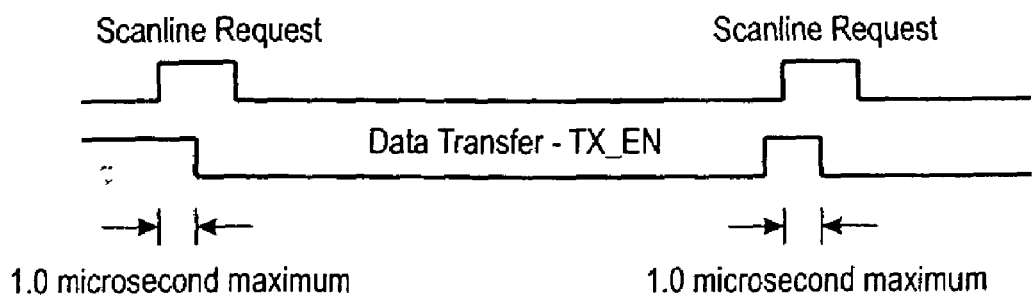
FIG. 5 is a timing diagram of scanline request.
Figure 6:
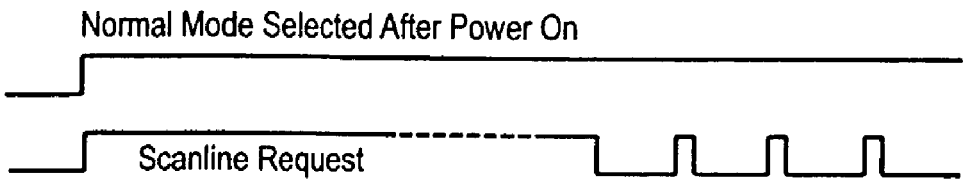
FIG. 6 is a timing diagram of scanline request after first mode select.
Figure 7:
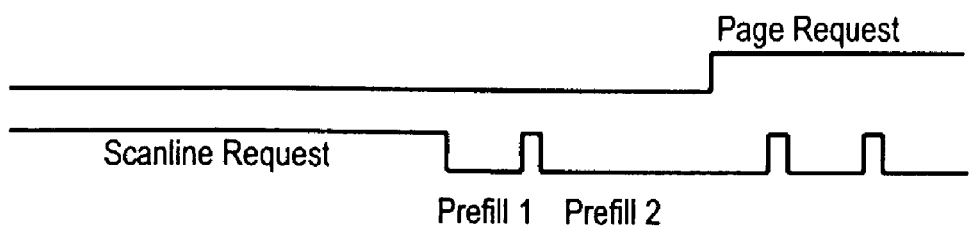
FIG. 7 is a timing diagram of the XIC FIFO prefill for the first page.
Figure 8:
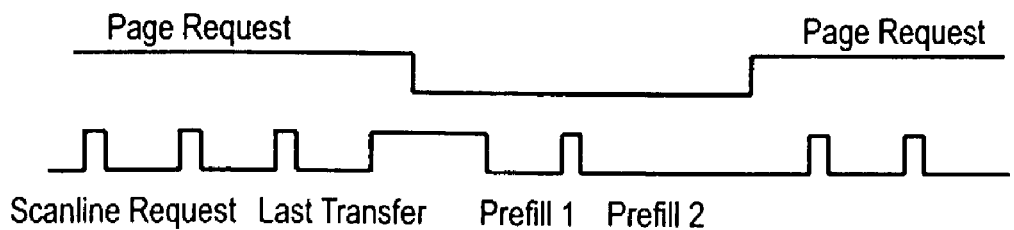
FIG. 8 is a timing diagram of the end of page timing.
Figure 11:
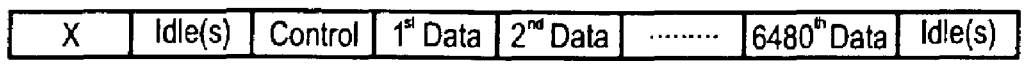
FIG. 11 is a timing diagram of a XCII to XIC scanline packet in normal model

A pre-fill of two scan-lines to the XIC FIFO is required before each page printing, refer to FIGS. 5, 6 and 7. For first page pre-fill process, XCII will monitor the line request only and ignore the page request from the XIC, and start to deliver the data to XIC if the XCII scan line FIFO has at least one scan line data available. A pre-fill process also takes place in interpage gap for next page printing, refer to FIG. 8. An entire scan line contains a control word followed by 6480 continuous sixteen bit data word transfer and ends with a idle frame, refer to FIG. 11. The idle frame at the end of scan line indicates to the XIC that it is the end of current scan line.

Figure 10:
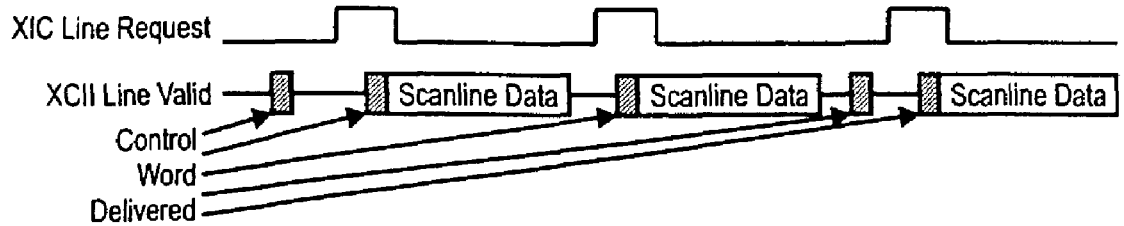
FIG. 10 is a timing diagram of a XIC line request and XCII transmission.

XIC will negate the line request signal, once it receives the first word of image data, as defined, the first word of each scan line is the control word. See FIG. 10. At the end of each scan line, if XIC FIFO has enough space, the next line request is reasserted and send to XCII. This operation continues until the last line request is received by XCII and XCII has delivered the last scan line data to XIC for the entire page.

Figure 12:
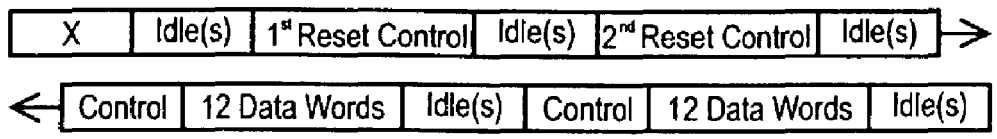
FIG. 12 is a timing diagram of XCII to XIC control and data transfer in diagnostic mode.
Figure 13:
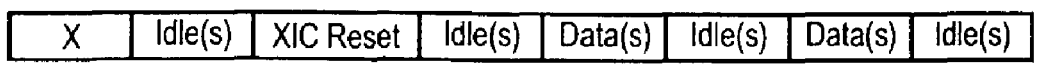
FIG. 13 is a timing diagram of XIC to XCII control and data transfer in diagnostic mode.

At that point, XCII will ignore further line request even it is active and wait until XCII detects that previous page request dropped and XIC FIFO emptied, then the line request for next page pre-fill is recognized. In dual-separations mode, each separation pre-fill process is similar to that in one-separation mode. At end of page, both separation '0' and '1' FIFOs must be checked for empty, before the pre-fill for next page can be initiated. The programming sequence to run this operation is as follows:

1) Program the Global configuration register as follows:
Bit [12]=0;
Bit [11]=set as desired; Disable Rendering Hints
Bit [10:8]=000;
Bit [7:6]=00;
Bit [5]=0;
Bit [4]=0;
Bit [3]=0;
Bit [2]=0;
Bit [1:0]=10 for dual separations: 11 for single separation.
2) Programming image size related registers, such as the pixel per scan-line registers, scan-line per page registers and enable related interrupt.
3) Perform two-steps reset sequence to XIC.
4) Set Separation GO bit In Diagnostic Mode the XCII receives the same data that it wrote to the XIC. This read-back data is written to the loop-back FIFO. The XCII then DMAs the loop-back data over the local bus back to the system. When a mode change is required to set XCII and XIC in diagnostic mode, the two steps reset sequence is performed. See FIG. 12. After XCII has sent the second reset control word to XIC, XIC will send exact one control word cycle with reset Complete bit=1 to XCII when XIC reset function is complete. At that point, XIC must put transceiver in idle state for at least one cycle before starting to send the returned diagnostic data frame back to XCII if data is available. After one reset complete control word is sent, no more control word are sent from XIC to XCII. All other word transfer is considered as returned diagnostic data words and single or multiple idle frames can be inserted in between. See FIG. 13.

Due to limited size of loop-back FIFO in the XCII for buffering the returned data, XCII can transfer a package of 13 words at a time. The first word in the burst is considered to be the Control word and the rest are Data words to XIC, refer to FIG. 12. The XCII will not transfer the next burst of data until the current burst is received back from XIC. In this mode, the first word following the idle frame from the XCII to XIC is the control word, reference FIG. 12. It is also the first word of the packet. The control word in this packet is not intended for reset or mode change purpose, it is for updating the LED display etc. When mode is reconfigured between normal and diagnostic, it is required to perform two-steps reset sequence to XIC.

The programming sequence to run this operation is as follows:

1) Program the Global Configuration Register as follows:
Bit [12]=0;
Bit [11]=0;
Bit [10:8]=set as desired;
Bit [7:6]=10;
Bit [5]=1 for separation '1':
  0 for separation '0';

Bit [4]=1 for DMA: 0 for I/O;
Bit [3]=1;
Bit [2]=0;
Bit [1:0]=11.

2) Programming image size related registers, such as the pixels per scan-line register, scanline per page registers, and enable related interrupt.

3) Perform two-steps reset sequence to XIC.

4) Set the separation GO bit.

The bit assignments for the XDM3-C (XCII) to XIC control words are shown in the table below.

| Bit Assignment | Signal |
|---|---|
| 15 | 1 |
| 14 | 0 |
| 13 | 1 |
| 12 | 0 |
| 11 | Spare |
| 10 | Spare |
| 09 | Spare |
| 08 | XIC Reset |
| 07 | XIC Reset' |
| 06 | XIC Reset |
| 05 | Mode 01 |
| 04 | Mode 00 |
| 03 | Test LED 3 |
| 02 | Test LED 2 |
| 01 | Test LED 1 |
| 00 | Test LED 0 |

BITS 15:12: Control Word Bits 15:12: are defined as the fixed pattern 1 0 1 0. The XIC will use these bits to verify receipt of a valid Control Word.

XIC RESET: XIC Reset and XIC Reset' are used by the XDM3-C to reset the XIC and clear the FIFO buffer. Three bits are used to reduce the probability of a false reset. XIC Reset and XIC Reset' are asserted to their respective states for a minimum of one microsecond.

Reset of the XIC is a two step process. In the first step XIC Reset is set to a logic 1, and XIC Reset' is set to a logic 0. The XIC returns a series of continuous control words to the XDM3-C with the Reset Complete bit equal to a logic 0. Idle characters are inserted to maintain synchronization. In the second step XIC Reset is set to a logic 0, and XIC Reset' is set to a logic 1 to complete reset sequence. The XIC returns a minimum of two sequential control words to the XDM3-C with the Reset Complete bit equal to a logic 1.

XIC mode changes are enabled in conjunction with XIC Reset.

MODE 01:00

The Mode bits are used to specify the mode of operation. Normal Mode is used to send image and tag data to the XIC. Diagnostic Mode is used to enable data turnaround on the XIC. In Diagnostic Mode the XIC reads data in the XIC FIFO and returns it to the XDM3-C. XIC mode changes require an XIC Reset to take place. Normal Mode is specified by setting Mode 0 to a logic 0. Diagnostic Mode is specified by setting Mode 0 to a logic 1. The mode bits are specified throughout the duration of the reset sequence.

The bit assignments for the XIC to XDM3-C (XCII) control words are shown in the table below.

| Bit Assignment | Signal |
|---|---|
| 15 | 1 |
| 14 | 0 |
| 13 | 1 |
| 12 | Mode |
| 11 | 0 (Reserved) |
| 10 | 1 (Reserved) |
| 09 | Reset Complete |
| 08 | Scanline Request 1 |
| 07 | Scanline Request 0 |
| 06 | Page Request 1 |
| 05 | Page Request 0 |
| 04 | Link Ready |
| 03 | FIFO Half Full |
| 02 | FIFO Empty |
| 01 | JIDI Error |
| 00 | JIDI Reset |

BITS 15:13: Control Word Bits 15:13 are defined as the fixed pattern 1 0 1. The XDM3-C may use these bits to verify receipt of a valid Control Word.

MODE: The Mode bit is provided for verification of XIC mode changes that are made as part of the reset sequence. The XDM3-C may verify the mode by testing this bit at the end of the reset sequence.

RESET COMPLETE: Reset Complete is used to indicate the completion of a reset sequence and mode change. The XIC returns at least two sequential control words to the XDM3-C with the Reset Complete bit equal to a logic 1 at the end of the reset sequence.

SCANLINE REQUEST: Scanline Request is sent from the XIC to the XDM3-C to request one scanline of image and tag data. This signal is derived from the FIFO Half Full Flag. Scanline Request is initially set if the FIFO buffer is less than half full. Scanline Request is reset by the XIC after it has received the first valid 16 bit word of XDM3-C image data. Scanline Request is set after the XIC has received a scanline of data from the XDM3-C if the FIFO is less than half full. End of scanline is indicated by idle in the TLK1501 receiver. The XIC provides two dedicated Scanline Request signals for compatibility with the XDM3-C design. The XIC utilizes Scanline Request 0. The XDM3-C is required to start data transfer within a specified time after detecting Scanline Request. This time is specified as 1 microsecond maximum.

PAGE REQUEST: This signal is the Page Request signal received from the JIDI bus. The XDM3-C sends image data to the XIC prior to the start of each page. This is required to meet JIDI bus timing requirements. The XIC provides two dedicated Page Request signals for compatibility with the XDM3-C design. The XIC utilizes Page Request 0.

LINK READY: Link Ready is set if the following two conditions are met: The XIC TLK2500 receiver is receiving idle frames or normal data characters. The optical transceiver signal detect output indicates sufficient signal for reliable operation of the link.

FIFO HALF FULL: This signal is the Half Full Flag provided by the XIC FIFO. FIFO Half Full is sent as a status and diagnostic signal only.

FIFO EMPTY: This signal is the Empty Flag provided by the XIC FIFO. FIFO Empty is sent as a status and diagnostic signal only.

JIDI ERROR: This signal indicates that the XIC has asserted the Error Signal on the JIDI bus. Error conditions include the following cases: FIFO Empty during data transfer to JIDI bus; FIFO Full during data transfer to JIDI bus; Error is sent as a status and diagnostic signal.

JIDI RESET: This signal is the Reset Signal received on the JIDI bus. Reset is sent as a status and diagnostic signal.

The XIC sends diagnostic data to the XDM3-C in diagnostic mode. The diagnostic data is sent by the TLK1501 transmitter. In diagnostic mode, the XIC reads data in the XIC FIFO and returns it to the XDM3-C. The diagnostic path includes a 16 bit synchronizing FIFO located between the XIC FIFO output and the TLK1501 transmitter. The synchronizing FIFO allows data clocked by the JIDI bus 25 MHz clock to be passed through to the TLK1501 transmitter input which is clocked at 75 MHz. The XIC returns XIC FIFO data to the XDM3-C when diagnostic mode is enabled.

In diagnostic mode the XIC does not send the Control Signals defined. As a result, the Scanline Request signal is not used. Since mode changes are made in conjunction with XIC Reset, the XIC FIFO will be cleared when Diagnostic Mode is enabled. The test sequence on the XDM3-C must accommodate round trip cable and interface delays. After Diagnostic Mode is enabled, the XIC will return Reset Complete. This is followed with idle frames until data is received from the XDM3-C.

After receiving Reset Complete, the XDM3-C may send diagnostic image data which will be written into the XIC FIFO. Since the Scanline Request signal is not used, the size of the data block sent by the XDM3-C must be no larger than the capacity of the XIC FIFO. The first word sent by the XDM3-C after idle is still defined as a Control Word in Diagnostic Mode.

In diagnostic mode, the XIC reads the 48 bit FIFO and returns the data to the XDM3-C with three 16 bit write cycles. The operation continues until the XIC FIFO is empty. Since the synchronizing FIFO is 16 bits wide and written at 25 MHz, the data returned to the XDM3-C will include both idle frames and data frames. The XIC is typically returned to Normal Mode after completion of the diagnostic test. The continuous Control Words resume in Normal Mode. Idle and valid data on the XDM3-C are indicated by the state of the TLK1501 receive data controls.

The protocol structure and method of the invention may be implemented in: application software such as image processing and editing software, operating systems having image processing capabilities, printer or display driver software, hardware such as ASIC chips and CPLDs in DFE's, printers, computers, or other image display or generation devices, or any other device or source for image generation.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A high speed serial interface, comprising:
    an initiator device for generating data and messages, wherein the initiator device includes a transceiver for sending and receiving data and messages using a serial protocol;
    a target device for receiving data and messages, wherein the target device includes a transceiver for sending and receiving data and messages using the serial protocol; and
    a transmission media for coupling the initiator device and the target device;
    wherein the serial protocol comprises a plurality of time frames comprising an idle message time frame for indicating a device is ready for communication, wherein each of the initiator device and the target device transmits an idle frame when it is ready for communication; a target control word frame for sending a data request from the target device; an initiator control word frame for indicating a transfer mode from the initiator device; and a data frame, wherein in response to a target control word frame containing a data request from the target device, the initiator device transmits an initiator control word frame followed by the requested data;
    wherein the initiator device comprises a digital front end (DFE), the target device comprises a printer and the transmission media comprises fiber optics; and
    wherein the printer control word frame further comprises a verification bit, a mode bit, a page request bit, a line request bit, a buffer status bit and a reset status bit.

2. The high speed serial interface of claim 1, wherein the DFE control word frame further comprises a verification bit, separation bits, a reset bit and a mode bit.

3. The high speed serial interface of claim 1, wherein an idle frame is sent by the printer while a serial link between the printer and the DFE is operational if neither a valid control word frame nor data is requested from the DFE.

4. The high speed serial interface of claim 1, wherein the serial protocol further comprises a reset sequence for changing mode comprising an idle frame, a DFE control word frame and an idle frame from the DFE.

5. A protocol structure for high-speed, serial digital front end (DFE)-printer communications, comprising:
    a plurality of time frames comprising an idle message time frame for indicating a device is ready for communication, wherein each of the DFE and the printer transmits an idle frame when it is ready for communication;
    a printer control word frame for sending a page request and a line request from the printer;
    a DFE control word frame for indicating a transfer mode from the DFE; and
    a data frame, wherein in response to a page request from the printer, the DFE transmits a control word frame followed by the requested data;
    wherein the printer control word frame further comprises a verification bit, a mode bit, a page request bit, a line request bit, a buffer status bit and a reset status bit.

6. The protocol structure of claim 5, wherein the DFE control word frame comprises a verification bit, separation bits, a reset bit and a mode bit.

7. The protocol structure of claim 6, wherein the mode bit indicates a normal mode of operation and a diagnostic mode of operation.

8. The protocol structure of claim 7, wherein normal mode means transmission of data from the DFE to the printer.

9. The protocol structure of claim 5, wherein an idle frame is sent by the printer while a serial link between the printer and the DFE is operational if neither a valid control word frame nor data is requested from the DFE.

10. The protocol structure of claim 5, further comprising a reset sequence for changing mode comprising an idle frame, a DFE control word frame and an idle frame from the DFE.

11. A method of transmitting data between an initiator device and a target device using a high speed, serial interface, comprising:
    transmitting, from the initiator device, an idle message frame indicating the initiator device is ready for transmission;

transmitting, from the target device, an idle message frame indicating the target device is ready for communication;

transmitting, from the target device, a target control word frame requesting transmission of data from the initiator device;

transmitting, from the initiator device in response to a target control word frame containing the data request from the target device, an initiator control word frame indicating a data transfer mode and the requested data;

wherein the initiator device comprises a digital front end (DFE) and the target device comprises a printer; and wherein the printer control word frame further comprises a verification bit, a mode bit, a page request bit, a line request bit, a buffer status bit and a reset status bit.

12. The method of claim 11 wherein the DFE control word frame further comprises a verification bit, separation bits, a reset bit and a mode bit.

13. The method of claim 11, wherein an idle frame is sent by the printer while the serial link is operational if neither a valid control word frame nor data is requested from the DFE.

* * * * *